(12) United States Patent
Chu et al.

(10) Patent No.: US 12,366,914 B2
(45) Date of Patent: Jul. 22, 2025

(54) DYNAMIC PROXIMITY BOUNDARY FOR DETECTING PROXIMATE OBJECTS

(71) Applicant: Apple Inc., Cupertino, CA (US)

(72) Inventors: Gregory D. Chu, Cupertino, CA (US); Joshua R. Ford, San Francisco, CA (US); Maxime Uzan, Harnes (FR); Pavel V. Dudrenov, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/670,064

(22) Filed: May 21, 2024

(65) Prior Publication Data
US 2024/0402793 A1    Dec. 5, 2024

Related U.S. Application Data

(60) Provisional application No. 63/505,222, filed on May 31, 2023.

(51) Int. Cl.
*G06F 3/01* (2006.01)
*G06T 7/20* (2017.01)
*G06T 7/50* (2017.01)
*G06T 11/00* (2006.01)

(52) U.S. Cl.
CPC ............. *G06F 3/011* (2013.01); *G06T 7/20* (2013.01); *G06T 7/50* (2017.01); *G06T 11/00* (2013.01)

(58) Field of Classification Search
CPC ... G06T 11/00; G06T 7/70; G06T 7/50; G06T 7/20; G06F 3/011
See application file for complete search history.

(56) References Cited

U.S. PATENT DOCUMENTS

| | | | | |
|---|---|---|---|---|
| 7,797,107 | B2 * | 9/2010 | Shiller | G08G 1/166 180/274 |
| 8,244,458 | B1 * | 8/2012 | Blackburn | G08G 1/166 342/174 |
| 9,104,201 | B1 * | 8/2015 | Pillai | G08G 5/727 |
| 10,019,006 | B2 * | 7/2018 | Shah | G05D 1/0206 |
| 10,665,019 | B2 * | 5/2020 | Hildreth | G06F 3/04815 |
| 10,872,531 | B2 * | 12/2020 | Liu | G06V 20/58 |
| 11,217,107 | B2 * | 1/2022 | Fragoso | G05D 1/12 |
| 11,231,715 | B2 * | 1/2022 | Tahir | B25J 9/1676 |
| 11,244,471 | B2 * | 2/2022 | Chilcote-Bacco | G06T 19/00 |
| 11,538,224 | B2 * | 12/2022 | Holz | G06F 3/00 |
| 11,724,690 | B2 * | 8/2023 | Kavadia | G06F 30/27 701/23 |
| 11,734,867 | B2 * | 8/2023 | Mirhosseini | G06T 7/292 345/619 |
| 12,039,684 | B2 * | 7/2024 | Raschke | G06T 19/20 |
| 12,067,673 | B2 * | 8/2024 | Garcia | G06T 15/40 |
| 12,229,331 | B2 * | 2/2025 | Powers | G06F 3/011 |
| 2016/0260328 | A1 * | 9/2016 | Mishra | G01S 13/931 |

(Continued)

Primary Examiner — Vinh T Lam
(74) Attorney, Agent, or Firm — Blank Rome LLP

(57) ABSTRACT

Providing a visual treatment based on proximity to an obstruction includes collecting, by a device, a sensor data for an environment, and determining a velocity of the device. A boundary of a volume around the device is determined based on the velocity. If a physical object is detected within the boundary based on the sensor data, then a notification procedure is initiated. The boundary of the volume dynamically changes as the velocity of the device or user changes.

20 Claims, 7 Drawing Sheets

(56) References Cited

U.S. PATENT DOCUMENTS

| | | | |
|---|---|---|---|
| 2020/0193831 A1* | 6/2020 | Hassan-Shafique | G08G 1/166 |
| 2022/0100265 A1* | 3/2022 | Kies | G06F 3/011 |
| 2023/0016490 A1* | 1/2023 | Berkebile | G06F 3/011 |
| 2023/0092395 A1* | 3/2023 | Madden | G06F 3/011 |
| | | | 345/633 |
| 2023/0154106 A1* | 5/2023 | Shimizu | G06V 10/761 |
| | | | 345/419 |
| 2024/0299840 A1* | 9/2024 | Huebner | A63F 13/428 |

\* cited by examiner

DYNAMIC PROXIMITY BOUNDARY FOR DETECTING PROXIMATE OBJECTS

BACKGROUND

Many multifunctional electronic devices are capable of generating and presenting extended reality ("XR") content. Often, these devices utilize an immersive display, such as a heads-up display, by which a user can interact with the XR content. The XR content may wholly or partially simulate an environment that people sense and/or interact with via the electronic device. However, by the very nature of the immersive experience, a user may be distracted from a surrounding physical environment, which may lead to a user being unaware of objects in a physical environment.

DETAILED DESCRIPTION

Figure 1A:
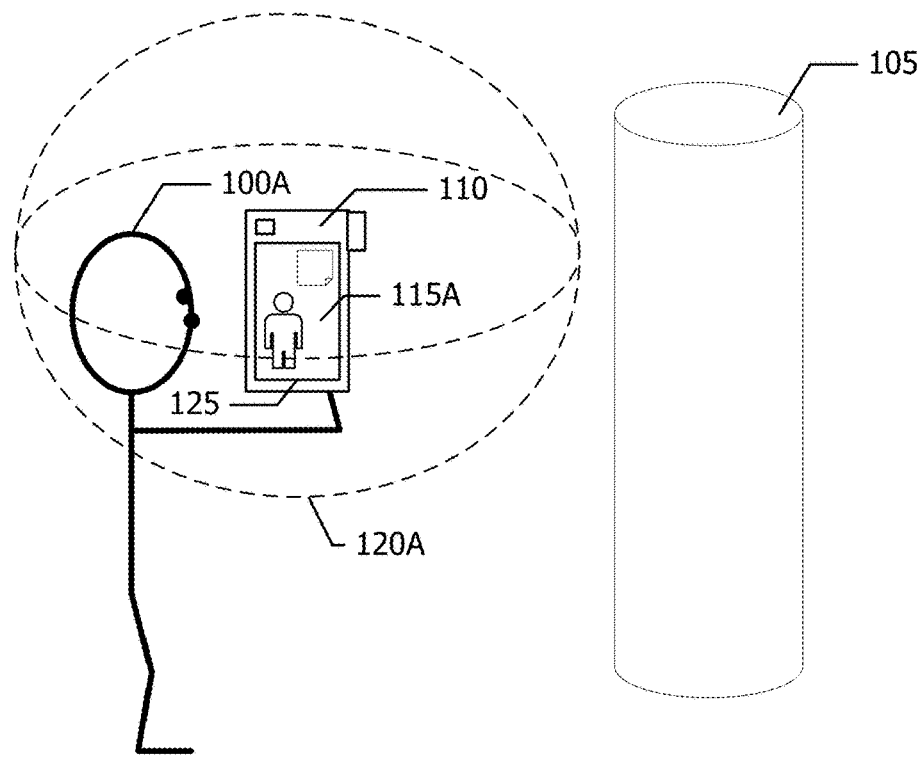
FIGS. 1A-1B show example system setups in which the disclosure may be practiced according to one or more embodiments.

This disclosure is directed to systems, methods, and computer readable media for dynamically generating proximity boundaries for detecting proximate objects. In general, techniques are disclosed to dynamically determine whether to modify presentation of virtual content and/or initiate a notification procedure based on a detection of a proximate object based on the dynamic proximate boundaries.

According to one or more embodiments, a volume may be defined around a user and/or a user's device which is used to detect proximate objects. In some embodiments, when a physical object is detected within the volume, the device will perform a response. For example, the device may initiate a notification procedure indicating to the user that a proximate object is detected. Additionally, or alternatively, the device may generate or modify a visual treatment applied to image data presented by the device to act as a notification of a detected proximate object.

According to one or more embodiments, the dynamic boundaries may be generated based on a velocity of the user and/or user's device. In some embodiments, a velocity of the user's device will be detected, including speed and direction. According to some embodiments, the boundary of the volume around the user will be modified dynamically based on the speed and/or direction of the velocity. For example, as a user's speed increases, the volume around the user and/or device may also increase. As a result, the user will have more time to respond when moving at a faster pace when a physical object is within the volume. In some embodiments, the boundaries may change in a uniform manner. For example, if the volume is in the shape of a sphere, the radius of the sphere may increase in all directions as the user's speed increases. Alternatively, in some embodiments, the volume may be an irregular shape which increases in a direction of the velocity. For example, if a user moves forward more quickly, the boundary in front of the user may increase with respect to the user, whereas a boundary behind the user may or may not change with respect to the user.

The volume may have a regular shape, such as a sphere, cylinder, cube, or the like. Alternatively, the volume may have an irregular shape. In some embodiments, the volume may be situated around a device and/or a user. For example, a central point of the volume may be based on a device location. Alternatively, the central point of the volume may be based on one or more locations of a user. For example, a head or hand location of a user may be used. In addition, in some embodiments, the volume may be a region surrounding the body of the user and multiple points may be used around which the volume is generated.

Sensor data may be collected by the user's device to determine whether a physical object is detected in the environment surrounding the user. In some embodiments, the device may determine, based on the sensor data, a location of the physical object detected. The location may be compared to the dynamic volume to determine whether the physical object lies within the volume, or has intersected the volume. If a determination is made that a physical object is detected within the volume boundary, then a notification procedure may be initiated. The notification procedure may include presenting a notification to the user that a physical object is detected within the boundary. In some embodiments, the notification procedure may include applying a visual treatment to image data presented to the user such that the visual treatment indicates to the user that a physical object is detected within the volume. The visual treatment may include, for example, modifying a presentation of physical and/or virtual content in the scene, removing virtual content from the scene to expose the physical object, or the like.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100*a* and 100*b*). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time-consuming but would nevertheless be a routine undertaking for those of ordinary skill in the art of image capture having the benefit of this disclosure.

A physical environment refers to a physical world that people can sense and/or interact with or without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and the like. With an XR system, a subset of a person's physical motions, or representations thereof, are tracked, and in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust the characteristic(s) of graphical content in the XR environment in response to representations of physical motions (e.g., vocal commands).

Figure 1B:
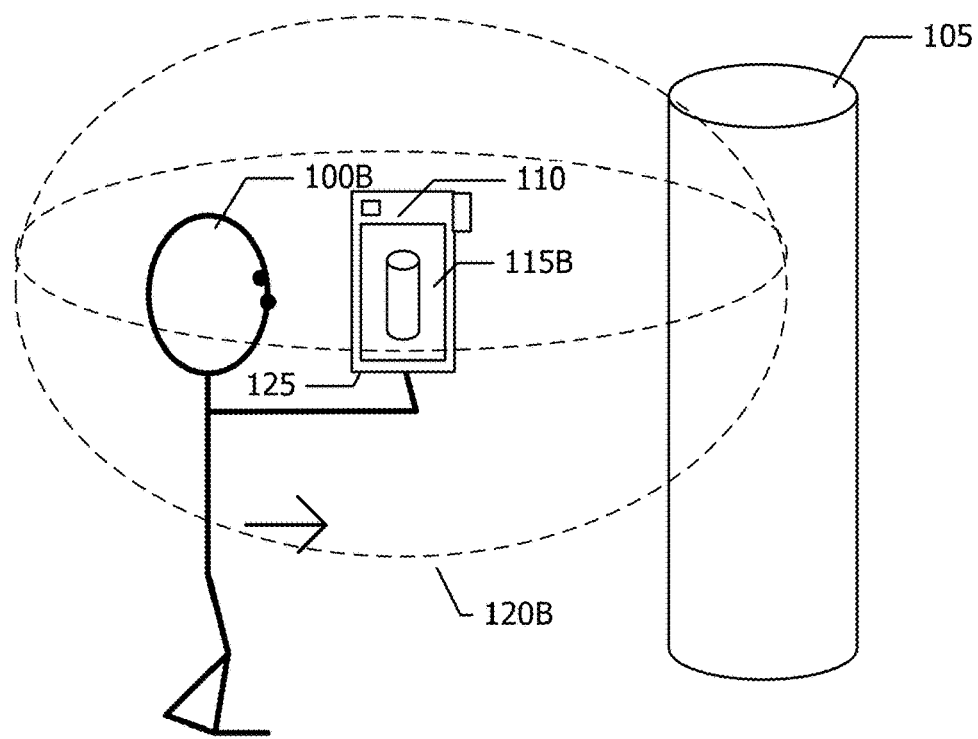

Referring to FIGS. 1A-1B, an example system setup is presented in which the disclosure may be practiced according to one or more embodiments. In particular, techniques described herein modify the presentation of virtual content presented to a user of the device when the user approaches a physical object in order to make the user aware of physical surroundings. FIG. 1A shows an example electronic device 110 having a display on which virtual content 115A is presented. For purposes of clarity, user 100A refers to a user at a first location moving at a first velocity. As will be described below, the user at a second location moving at a second velocity will be referred to as 100B. As such, the reference number 100 will refer to the user generally. Electronic device 110 may include a device configured to present virtual content for a user. In some embodiments, the electronic device 110 may be a wearable device, such as a head mounted device, by which the user 100 interacts with a mixed reality environment.

Virtual content 115A may include augmented reality content, virtual reality content, or any kind of extended reality content. Virtual content may be presented, for example, while the user is involved in an immersive experience. The display 125 may be an opaque display, an immersive display such as an optical see-through display, pass-through display, or the like. A user may use electronic device 110 to view the virtual content 115A while the user is within a physical environment. The physical environment may have physical objects, such as physical object 105. Physical object in the environment may include, for example, static objects such as furniture, walls, doors, fixtures, and the like. Physical objects may also include dynamic objects such as pets, animals, people, or other objects which may be moving through the environment.

According to one or more embodiments, the device 110 may track proximate objects in the physical environment. In some embodiments, the device 110 determines a volume boundary 120A in order to determine whether a physical object in the environment is a proximate object. In particular, the electronic device 110 may include one or more sensors which can detect physical objects in the environment. The device can include sensors, such as depth cameras, LIDAR, or the like, which may be used to detect physical objects and determine corresponding locations of physical objects. A physical object can be determined to be a proximate object if a portion of the physical object falls within the volume boundary 120A.

According to one or more embodiments, the device 110 continuously modifies the volume boundary 120A based on a velocity of the user 100A. In some embodiments, the faster the user 100A moves, the larger the boundary volume (thereby identifying objects further away as proximate objects). A default boundary volume may be used, for example, if a user or the user device is still. The volume boundary 120A may be centered around the user 100A or a portion of the user, or around the user device 110. For example, a device location may be used to approximate a user location and the volume boundary 120A may be generated around the point in 3D space determined to be the device location. In FIG. 1A, the user 100A is not moving, or is moving at a sufficiently slow pace such that the volume boundary 120A does not encompass or intersect the physical object 105. As such, the virtual content 115A is presented on the display 125 without interruption.

By contrast, turning to FIG. 1B, user 100B is moving at a more rapid pace, and is moving toward the physical object 105. In response to the velocity increasing, the volume boundary 120B has also increased. As a result, the physical object 105 now intersects the volume boundary 120B. In response, the device 110 can implement a notification procedure, such as notifying the user of the proximate object, or modifying presentation of the virtual content. Here, the device 110 provides a notification procedure by removing at least a portion of the virtual content from the display such that the physical object 105 in the physical environment is visible as displayed object 115B. This may occur, for example, by presenting pass-through camera data on the display 125 so that the user can see the physical object 105. As described above, the volume boundary 120B may be an irregular shape. Here, the volume boundary 120B is an elongated shape. However, it should be understood that in some embodiments, the volume boundary may stay a regular shape, such as a sphere. Further, in some embodiments, the original volume boundary 120A may be an irregular shape.

Although not shown, if the user stopped moving, then the volume boundary 120B may shrink back down in response to the reduced velocity. As a result, the physical object 105 may no longer be present within the volume boundary 120. As such, the notification procedure may be ceased. In the example shown, if the notification procedure is ceased, then the virtual content 115A may be presented on the display 125 such that the physical object 105 is no longer visible, or is less visible than during the notification procedure. In some embodiments, the shrunken boundary may be large enough such that when the user stops, the physical object 105 remains within the boundary. As such, the notification procedure may remain in effect when the user stops moving when physical object 105 is still within the shrunken volume boundary.

According to one or more embodiments, the notification procedure may include applying a visual treatment to the content displayed on the display 125, such as an animation, change in color, or other modification to a virtual object. Further, in some embodiments, the visual treatment may include changes to the presentation to the user, such as causing a breakthrough display such that the physical object, or characteristics of the physical object, are made visible to the user. According to some embodiments, various visual treatments may be applied, and a particular visual treatment may be selected based on a proximity of the device, or a user of the device, to the physical object. For example, multiple volume boundaries may be determined around a user and/or user device, and may be associated with different visual treatments. As another example, a visual treatment may be applied dynamically as a user approaches the physical object. For example, a particular animation may be applied to the content presented on the display, such as a wave movement across the displayed content, a movement of the displayed content, or the like. As another example, a color treatment may be applied to displayed content, such as applying a color overlay to displayed content, or a portion of the displayed content, to indicate to the user that the user is approaching the physical object.

Figure 2:
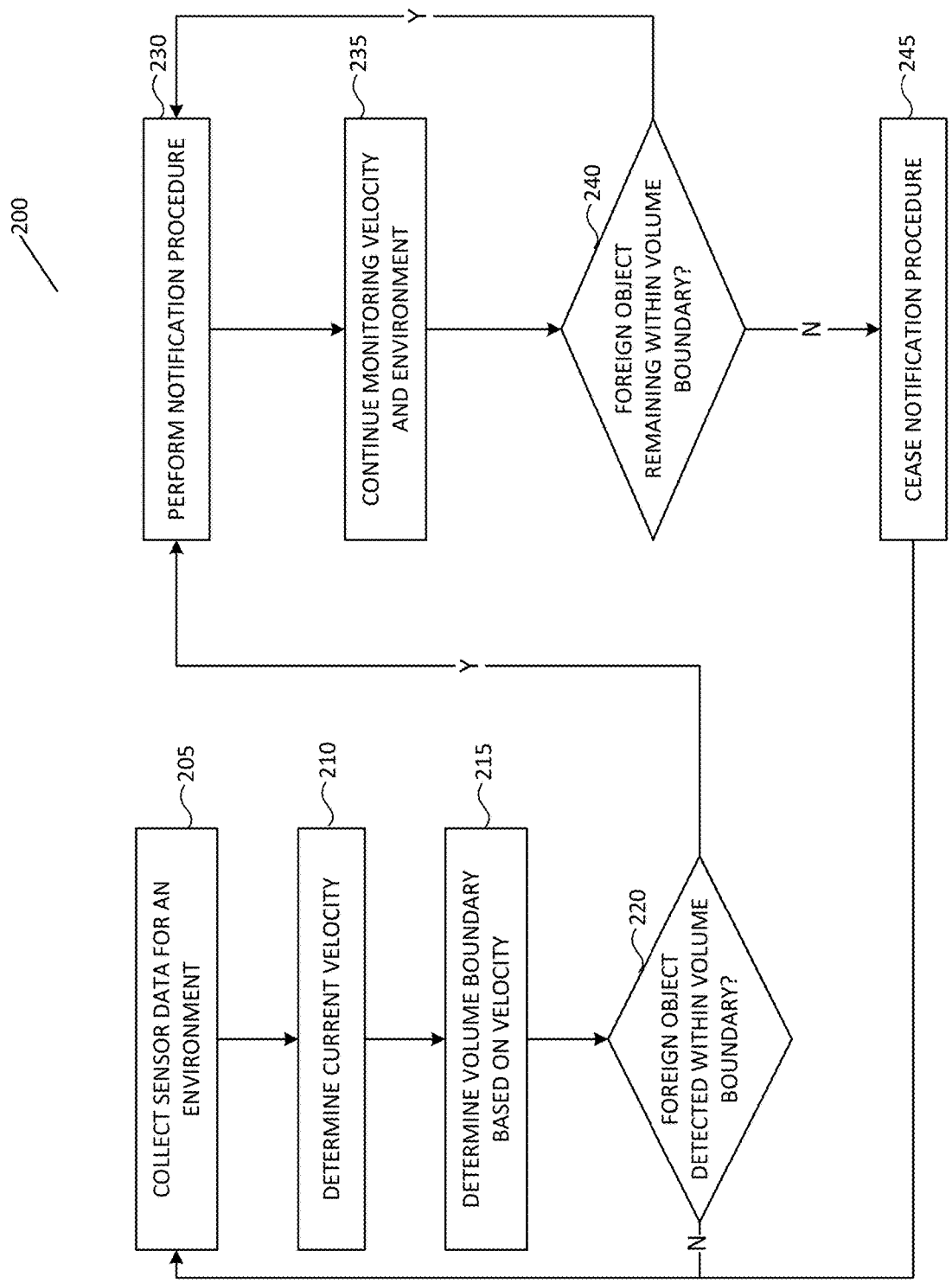
FIG. 2 shows, in flowchart form, a technique for implementing a notification procedure based on a boundary intersection, in accordance with one or more embodiments.

FIG. 2 shows, in flowchart form, a technique for implementing a notification procedure based on a boundary intersection, in accordance with one or more embodiments. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added.

The flowchart 200 begins at block 205, where the electronic device collects sensor data for environment. In particular, the device can include one or more sensors which can determine characteristics surrounding the device in the physical environment. For example, the device can include sensors such as cameras, depth sensors, LIDAR, or other technology which provides sensor data indicative of objects in a physical environment surrounding the device. The sensor data therefore may include image data, depth data, and other data corresponding to characteristics of the physical environment. In some embodiments, the electronic device may transmit a signal into the environment to detect whether any objects are in the environment, or may receive signal data and/or an indication from an additional device that a physical object exists in the environment.

The flowchart 200 continues to block 210 where a velocity is determined. In some embodiments, the velocity may be determined with respect to the device and/or the user. For example, the electronic device may include sensors which can be used to track a velocity of the device in the physical environment, such as an accelerometer, gyrometer, or the like. Further, in some embodiments, the device may be configured to use additional or alternative techniques for determining velocity. Examples include vision-based techniques such as simultaneous localization and mapping ("SLAM"), scale-invariant feature transform ("SIFT"), or the like. Velocity includes speed and/or direction according to one or more embodiments.

At block 215, a volume boundary is determined based on the velocity. In some embodiments, the volume may be defined as regions of space with a predetermined relationship to the electronic device and/or user such that the volume moves through the physical environment as the user/device moves. For example, the volume may be in a configuration with respect to the device, such as a particular distance and orientation in relation to the device that delineates the volume boundary. Thus, a location of the device and/or user within the physical environment is used as an origination point or region from which a volume around the device can be determined. According to one or more embodiments, the volume boundary may be a regular or irregular shape. For example, the volume may include a boundary in a plane in front of the electronic device and/or user, in an arc around the electronic device and/or user, in a sphere or cylinder around the electronic device and/or user, or the like.

The volume boundary may be dynamically determined, for example on a per-frame basis corresponding to image frames collected by the device from which sensor data is collected for the environment. The volume boundary is dynamically modified based on the velocity of the device. For example, as the velocity increases, the boundary volume may increase around the device and/or user at least in a direction coincident with the direction of the velocity. Similarly, as the velocity decreases, the boundary volume may decrease around the device and/or user.

According to one or more embodiments, the volume boundary may be determined between a minimum volume and maximum volume around a user. For example, if a device and/or user is not moving, a minimum volume may be used. In some embodiments, the minimum volume may include not using a volume around the device and/or user. In some embodiments, a maximum volume may also be used, for example when a device and/or user is moving at a fast speed. The volume boundary may be based on a determined distance from a user that is determined based on the speed and/or direction of the velocity of the user.

The flowchart 200 continues to block 220 where a determination is made as to where a foreign physical object is detected within the boundary. That is, a determination is made as to whether a physical object other than the user and/or user device (or peripheral devices) are detected to have intersected the boundary volume. The physical object may be a static object, such as a wall, furniture, appliance, plants, or the like. Additionally, or alternatively, the physical object may include a dynamic object, such as other people, pets, animals, and other moving objects. Detecting the object may include detecting a presence of any generic object, or may include identifying a particular object. In some embodiments, depth information may be used to determine that one or more objects are present in the environment.

If at block 220 no foreign object is detected within the volume boundary, then the flowchart 200 returns to block 205, and sensor data is continuously collected from which a velocity can be determined, thereby continuously modifying a volume boundary accordingly. Similarly, the sensor data may be monitored to determine whether a foreign object is detected within the volume boundary.

Returning to block 220, if a determination is made that a foreign object is detected within the volume boundary, then the flowchart 200 proceeds to block 230, where a notification procedure is performed. As will be described in greater detail below, the notification procedure may include displaying or otherwise presenting a notification to the user with some indication of a foreign object is detected within the boundary. This may include, for example, a text notification, audio notification, visual notification, haptic notification, or the like. Additionally or alternatively, the notification procedure may include applying visual treatment to image data presented on the device. For example, in some embodiments, the virtual content may be removed from the image data presented by the device in order to improve or increase visibility of the physical object. In other examples, the visual treatment may include an animation, a change in color, a change in opacity, brightness, or the like.

The flowchart 200 proceeds to block 235, where the velocity of the environment continues to be monitored. This includes receiving additional sensor data for the environment while the notification procedure is presented. The sensor data includes data related to detecting the presence of foreign objects in the environment, as well as dynamically determining the velocity of the user and/or device. For example, the processes described above with respect to blocks 205, 210, and 215 may occur, for example on a per-frame basis, while the velocity and environment are continued to be monitored at block 325. Then, at block 240, a determination is made as to whether a foreign object remains within the volume boundary. According to some embodiments, the determination may be made on a frame-by-frame basis in accordance with the sensor data, or at some other interval. For example, at each frame, a determination may be made as to whether, for the particular volume determined for that frame, whether a foreign object is present. If a determination is made that the foreign object remains within the volume boundary (or, that a foreign object is within the boundaries for the particular frame regardless of whether it is the same foreign object or not), then the flowchart returns to block 230, and the notification procedure continues to be performed.

Returning to block 240, if a determination is made that no foreign object is detected within the volume boundary for a particular frame, or a particular interval, then the flowchart 200 proceeds to block 245, and the notification procedure is ceased. Ceasing the notification procedure may include, for example, removing a visual treatment, ceasing a visual or audio presentation of the notification, resuming and intended opacity, brightness, coloration, animation, or the like. The flowchart 200 then proceeds to block 205, and the device continues to monitor velocity and objects of the environment as the device and/or user moves within the physical environment.

Figure 3:
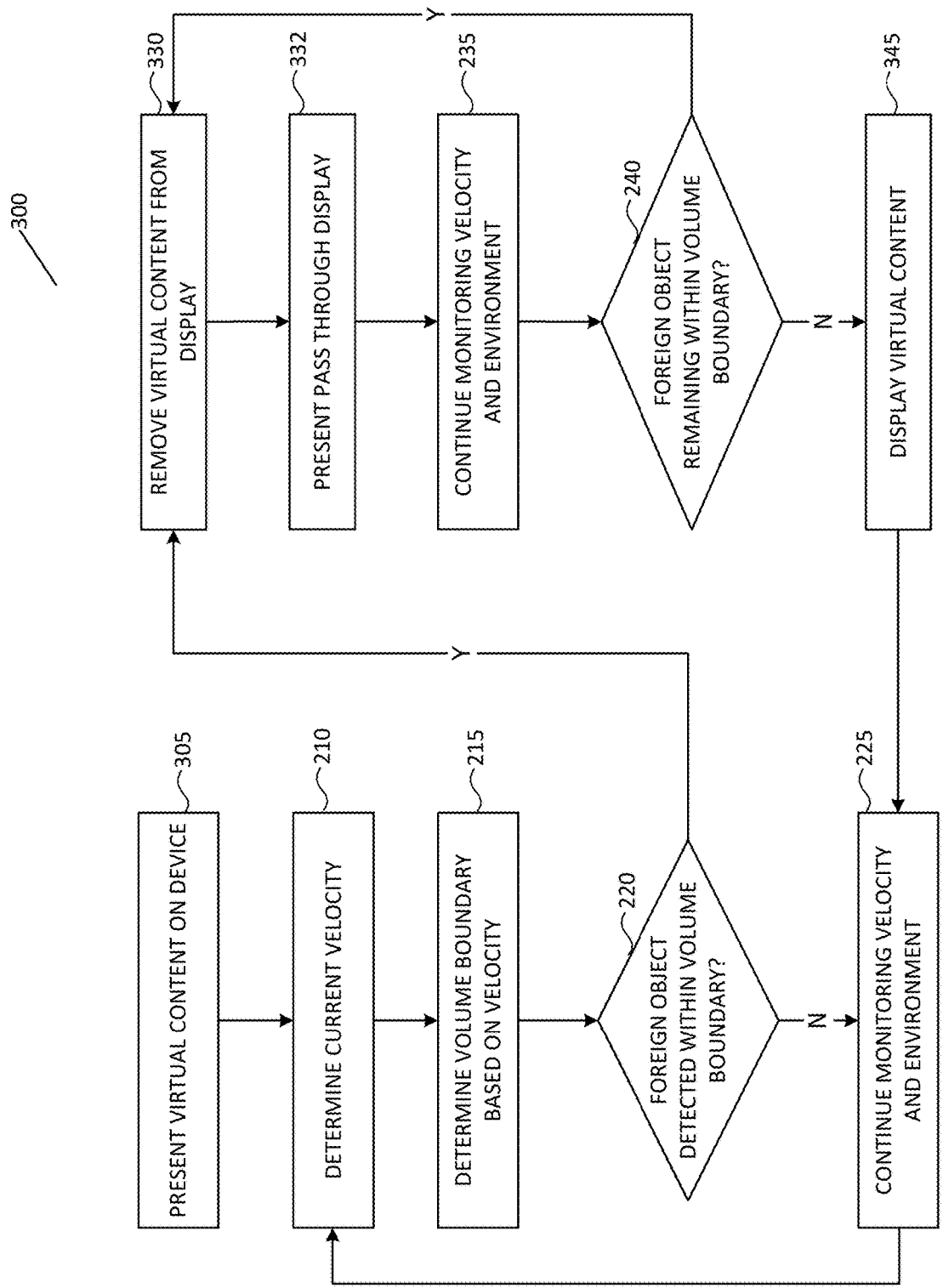
FIG. 3 shows, in flowchart form, a technique for modifying a presentation of virtual content based on a boundary intersection, according to one or more embodiments.

FIG. 3 shows, in flowchart form, a technique for implementing a notification procedure based on a boundary intersection that includes modification of virtual content, in accordance with one or more embodiments. For purposes of explanation, the following steps will be described in the context of FIGS. 1-2. However, it should be understood that the various actions may be taken by alternate components. In addition, the various actions may be performed in a different order. Further, some actions may be performed simultaneously, and some may not be required, or others may be added.

The flowchart 300 begins at block 305, where virtual content is presented on a device. The device may include, for example, a wearable device such as a head mounted device. The device may be used to interact with virtual content and an immersive matter. For example, the head mounted device may include a display situated in front of the user's eyes on which virtual content is presented. In some embodiments, the virtual content may be presented along with a view of the physical environment, or in place of a view of the physical environment. For example, the virtual content may include virtual-reality content which replaces a view of the physical environment. As another example, the virtual content may include augmented reality content in which virtual content is presented in a view of the physical environment. For example, the device may include a pass-through content of the physical environment which is displayed on the display along with the virtual content.

The flowchart 300 also includes determining a current velocity of a device and/or user, as shown at block 210. As described above with respect to FIG. 2, the velocity is determined based on sensor data captured by the device, and includes speed and/or direction according to one or more embodiments. Similarly as described above with respect to FIG. 2, the flowchart 300 also includes determining a volume boundary based on the velocity at block 215, and determining whether a foreign object is detected within the volume boundary at block 220. If, at block 220, a determination is made that no foreign object is present within the volume boundary, then the flowchart proceeds to block 225, where the device continues to monitor the velocity and the environment within the region to determine, dynamically, whether a foreign object is detected. As such, the flowchart 300 returns to block 210, and sensor data is continuously collected from which a velocity can be determined, thereby continuously modifying a volume boundary accordingly. Similarly, the sensor data may be monitored to determine whether a foreign object is detected within the volume boundary.

Returning to block 220, if a determination is made that a foreign object is detected within the volume boundary, then the flowchart 300 proceeds to block 330, where virtual content is removed from a display. In some embodiments a visual treatment may be applied to the virtual content presented at block 305. For example, the virtual content may be removed from the image data presented by the device in order to improve or increase visibility of the physical environment, including at least part of the object which has intersected the volume boundary. In other examples, the visual treatment may include an animation, a change in color, a change in opacity, change in brightness, or the like. For example, an opacity of the virtual content may be reduced to indicate that a foreign object is detected.

The flowchart 300 proceeds to block 332, where the pass-through display is presented. That is, the visual treatment applied to the virtual content (such as reducing the opacity of the virtual content or otherwise removing image data associated with the virtual content from frames presented to a user), the visibility of pass-through camera data increased at least at a region at which the foreign object is detected.

At block 235, the velocity of the environment continues to be monitored. This includes receiving additional sensor data for the environment while the visual treatment is applied to enhance visibility of the physical environment, and in particular the detected foreign object. The sensor data includes data related to detecting the presence of foreign objects in the environment, as well as dynamically determining the velocity of the user and/or device. Then, at block 240, a determination is made as to whether a foreign object remains within the volume boundary. If a determination is made that the foreign object remains within the volume boundary (or, that a foreign object is within the boundaries for the particular frame regardless of whether it is the same foreign object or not), then the flowchart returns to block 330, and the virtual content continues to be removed.

Returning to block 240, if a determination is made that no foreign object is detected within the volume boundary for a particular frame, or a particular interval, then the flowchart 300 proceeds to block 345, and the virtual content is again displayed as intended. For example, a particular application running on the device may direct the virtual content to be presented in a particular manner according to regular use. The removal of the virtual content may be an application-level or system-level override which causes the intended presentation of the virtual content to be modified. When the foreign object is no longer detected within a current boundary volume, then the virtual content can be displayed as the source application of the content intended, thereby returning to an intended display location, opacity level, and the like. The flowchart 300 then proceeds to block 225, and the device continues to monitor velocity and objects of the environment as the device and/or user moves within the physical environment.

Figure 4:
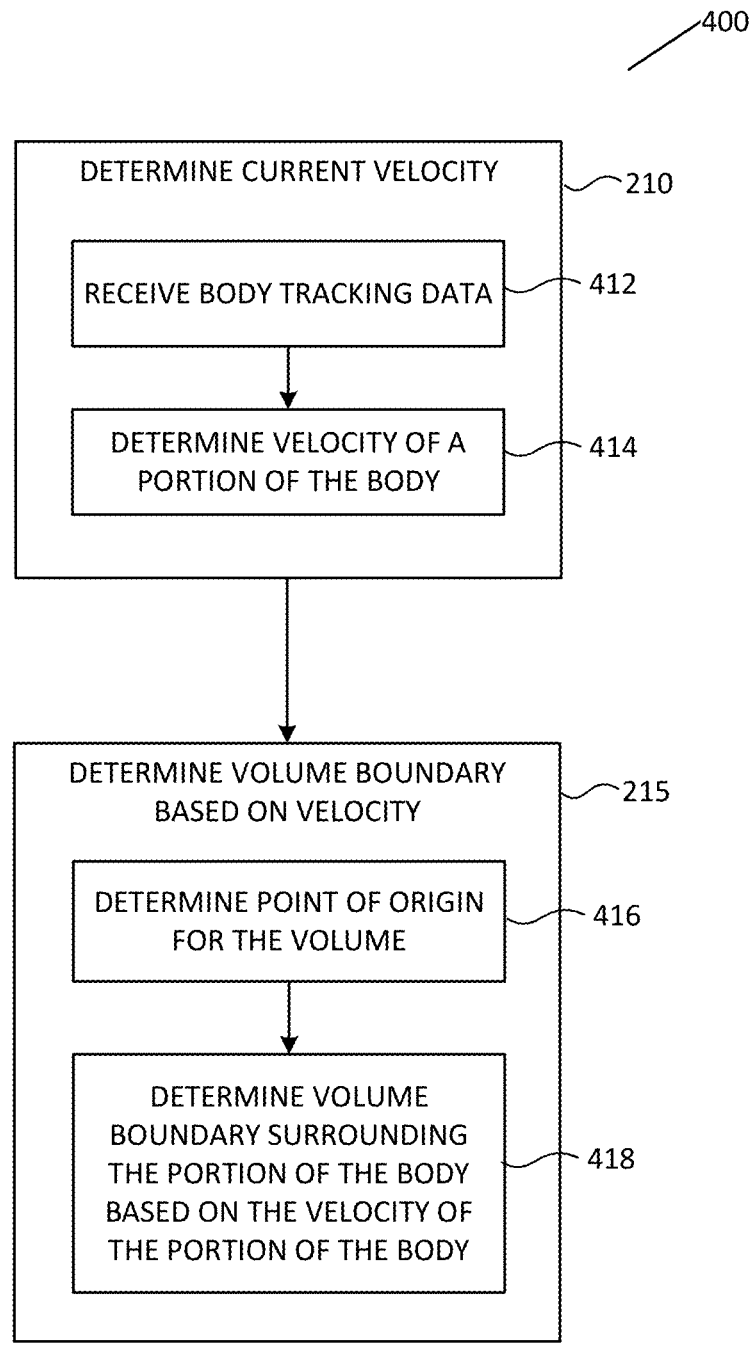
FIG. 4 shows, in flowchart form, a technique for dynamically modifying a volume boundary, according to one or more embodiments.

According to one or more embodiments, the velocity described above, for example at block 210, may be determined by sensor data on a head-mounted device, such as an IMU. In some embodiments, velocity of different parts of a user may be used to determine whether a user may collide with an object in the environment, such as a user swinging an arm or performing hand gestures. As such, in some embodiments, the velocity tracked to determine a volume boundary may be based on body tracking data. FIG. 4 depicts a flowchart of a technique for dynamically determining a boundary volume based on body tracking data, in accordance with one or more embodiments. In particular, FIG. 4 depicts a flowchart of an example embodiment of FIG. 2. For purposes of explanation, the following steps will be described in the context of FIGS. 1-2. However, it should be understood that the various actions may be taken by alternate components. In addition, the various actions may be performed in a different order. Further, some actions may be performed simultaneously, and some may not be required, or others may be added.

The flowchart 400 begins with block 210, where the current velocity for the user and/or devices is determined. For purposes of this example, the current velocity is determined based on a velocity of a user of the device. For example, the volume boundary may be tied to a portion of the user such as the user's hand, arm, or other body part. In this example, the flowchart 400 includes, at block 412, receiving body tracking data. According to one or more embodiments, the electronic device may include one or more sensors which are configured to detect movement of the body. This may include, for example, cameras and other sensors which are directed downward or away from the user from a head mounted device in such a manner that users body motions can be tracked. Body tracking data may be used to determine characteristics about a user's movement. This may include, for example, pose, location, velocity, rotation, and the like. In some embodiments, the enrollment information may be used to determine characteristics about the user which may enable body tracking.

The flowchart 400 continues to block 414, where a velocity of at least a portion of the body is determined. In some embodiments, the portion of the body for which velocity is determined is based on a portion of the body which is tied to the volume boundary. For example, a joint of a hand, arm, leg, or the like may be used as an origin location around which a volume boundary is generated. Thus, the velocity of the origin may be determined based on the body tracking data received at block 412. Velocity includes, for example, a speed and direction of the tracked portion of the users body associated with the volume boundary. In some embodiments, the velocity may include angular velocity when the movement of the tracked body part is moving in a rotational direction.

At block 215, a volume boundary is determined based on the velocity of the portion of the body, as determined at block 414. In some embodiments, the volume may be defined as regions of space with a predetermined relationship to the electronic device and/or user such that the volume moves through the physical environment as the user/device moves.

At block 416, determining the volume boundary includes determining a point of origin for the volume. According to one or more embodiments, the point of origin may be the tracked portion of the body for which velocity is determined. For example, the point of origin may be a particular joint of the user's body, such as a joint location of an arm, leg, or the like. Notably, in some embodiments, the part of the body used to determine velocity may differ from the point of origin around which the volume boundary is determined. As an example, hand, arm, or leg movement may be tracked to determine a volume boundary around an origin at a user's head or torso.

The flowchart 400 concludes at block 418, where the volume boundary is determined surrounding the portion of the body based on the velocity of the portion of the body. That is, the boundary of the volume is generated to be positioned at a distance away from the point of origin (or associated body part) that is determined based on the determined velocity. As described above, the volume boundary may be dynamically determined, for example, on a per-frame basis corresponding to image frames collected by the device from which sensor data is collected for the environment. The volume boundary is dynamically modified based on the velocity of the portion of the body used as a point of origin for the volume boundary. For example, as the velocity increases, the boundary volume may increase around the portion of the body of the user at least in a direction coincident with the direction of the velocity. Similarly, as the velocity decreases, the boundary volume may decrease around the device and/or user.

Figure 5:
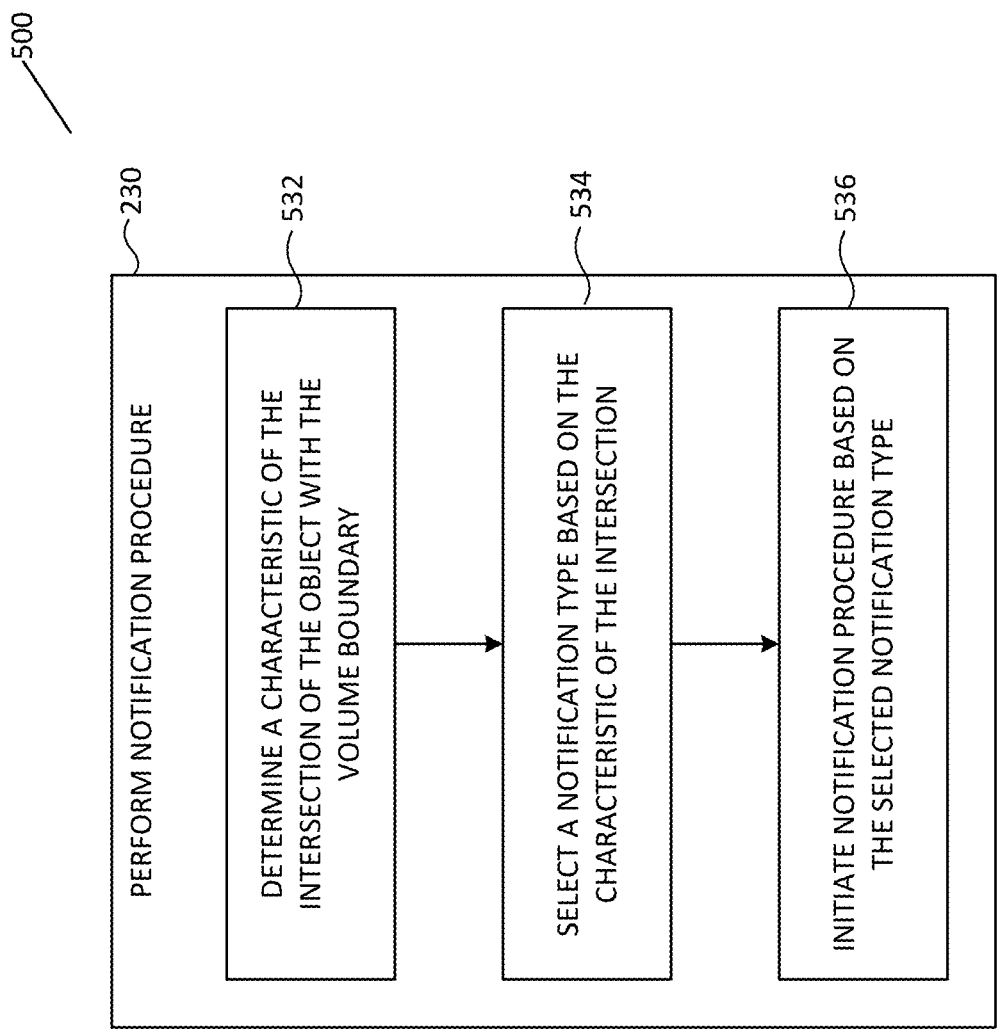
FIG. 5 shows, in flowchart form, a technique for performing a notification procedure, according to one or more embodiments.

FIG. 5 depicts a flowchart of a technique for performing a notification procedure based on characteristics of the intersection of a foreign object with the volume, in accordance with one or more embodiments. For purposes of explanation, the following steps will be described in the context of FIGS. 1-2. However, it should be understood that the various actions may be taken by alternate components. In addition, the various actions may be performed in a different order. Further, some actions may be performed simultaneously, and some may not be required, or others may be added.

The flowchart 400 depicts an example embodiment of performing a notification procedure, as described above with respect to block 230 of FIG. 2. The notification procedure may include modifying a user experience in an immersive environment in accordance with a detected collision between a foreign object and the boundary volume such that the user is notified of the presence of the foreign object within the boundary object.

The flowchart 500 begins at block 532, where characteristics of the intersection of the foreign object and the volume boundary is determined. Characteristics of the intersection may include, for example, an amount of the volume in which the foreign object is detected, a location within the volume at which the foreign object is detected, or the like. The characteristics may be determined, for example, based on sensor data received by the user's device which detects the presence of objects. In some embodiments, a particular sensor capturing data by which the object is detected may indicate a particular portion or region of the volume boundary or within the volume at which the foreign object is located. Some examples of characteristics of the intersection include how close the foreign object is detected to the user, how large the foreign object is detected, a relative location of the foreign object to the user (such as in front of the user or behind the user), and the like.

The flowchart 500 proceeds to block 534, where a notification type is selected based on a characteristic of the intersection. For example, if the characteristic of the intersection indicates that the intersection is not within the field of view of the user (for example, if the intersection is behind the user), then the notification type may include an audio notification, whereas if the intersection lies in the field of view of the user, a visual indication may be used. As another example, an intersection of the object at the boundary may indicate a less intrusive notification than a foreign object detected closer to the user. For example, when a foreign object is detected at the volume boundary, a modest visual treatment may be performed, such as an animation of the virtual content, a change in coloration, opacity, brightness, or other visual treatment may be applied to the virtual content. By contrast, when a foreign object is detected closer to a user, a more explicit notification may be provided, such as a visual indication, the removal of virtual content, or the like. Similarly, the type of notification may be associated with a timeout period, wherein in after a certain amount of time, number of frames, or the like, if a foreign object continues to be detected within the volume, then the notification procedure may be ceased. In some embodiments, different notification types may be associated with different timeout periods. In some embodiments, other types of notifications can be used, such as haptic feedback, and the like.

The flowchart 500 concludes at block 536, where the notification procedure is initiated based on the selected notification type. The notification procedure may be performed based on the selected notification type, such as selected notification characteristics. In some embodiments, the type of notification may also be modified on a per-frame or other periodic basis. As such, the characteristics of the notification may change while a same foreign object is detected within the volume. Moreover, the notification procedure may be ceased in accordance with any relevant timeout period.

Figure 6:
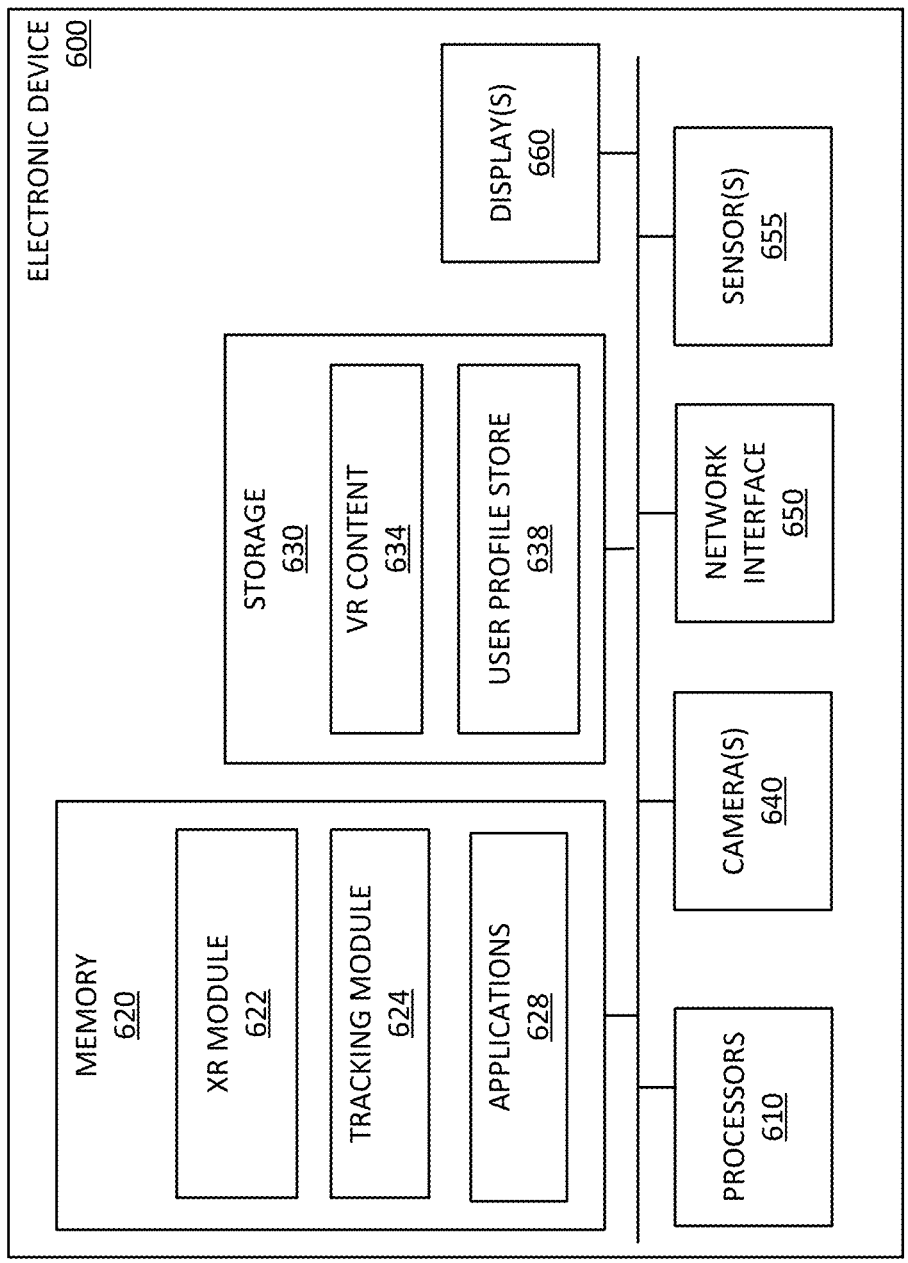
FIG. 6 shows an example system diagram of an electronic device, according to one or more embodiments.

Referring to FIG. 6, a simplified block diagram of an electronic device 600 is depicted, in accordance with one or more embodiments of the disclosure. Electronic device 600 may be part of a multifunctional device, such as a mobile phone, tablet computer, personal digital assistant, portable music/video player, wearable device, or any other electronic device that includes a camera system. FIG. 6 shows, in block diagram form, an overall view of a system diagram capable of supporting proximity detection and notification, according to one or more embodiments. Electronic device 600 may be connected to other network devices across a network via network interface 650, such as mobile devices, tablet devices, desktop devices, as well as network storage devices such as servers and the like. In some embodiments, electronic device 600 may communicably connect to other electronic devices via local networks to share sensor data and other information about a shared physical environment.

Electronic Device 600 may include processors 610, such as a central processing unit (CPU). Processors 610 may include a system-on-chip such as those found in mobile devices and include one or more dedicated graphics processing units (GPUs). Further, processors 610 may include multiple processors of the same or different type. Electronic Device 600 may also include one or more memory 620. Memory 620 may each include one or more different types of memory, which may be used for performing device functions in conjunction with processor 610. For example, memory 620 may include cache, ROM, and/or RAM. Memory 620 may store various programming modules in the form of computer readable code comprised on a non-transitory compute readable medium during execution, including XR module 622, tracking module 624, and other various applications 628. According to some embodiments, XR module 622 may provide an immersive experience to the user, for example through augmented reality, virtual reality, extended reality, enhanced reality, and the like. Tracking module 624 may utilize data from camera(s) 640 and/or sensor(s) 655, such as proximity sensors, to determine a location of the electronic device 600, a user of electronic device 600, and/or other objects in the physical environment.

Electronic Device 600 may also include storage 630. Storage 630 may be comprised of one or more different storage device, which may be used for storing data used by the programming modules shown in memory 620. For example, storage 630 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Storage 630 may include VR content 634, which may include augmented reality content, virtual reality content, or any kind of extended reality content. In some embodiments, storage 630 may also include a user profile store 638. User profile store may be used to store data related to a user profile for purposes of detecting proximate objects, such as user gait or average velocity which may affect when a user should be alerted as to a proximate object. In some embodiments, user profile store 638 may comprise user-specified data, such as a threshold distance at which a notification should be provided or the like.

Electronic device 600 may also include one or more cameras 640. Each of the camera(s) 640 may each include an image sensor, a lens stack, and other components that may be used to capture images. In one or more embodiments, the cameras may be configured to face different directions from the electronic device. For example, a front-facing camera may be positioned in or on a first surface of the electronic device 600, while the back-facing camera may be positioned in or on a second surface of the electronic device 600. In some embodiments, camera(s) 640 may include one or more types of cameras, such as RGB cameras, depth cameras, and the like. Electronic device 600 may include one or more sensor(s) 655 which may be used to detect physical objects in an environment. Examples of the senor(s) 655 include LIDAR and the like.

In one or more embodiments, the electronic device 600 may also include a display 660. Display 660 may be any kind of display device, such as an LCD (liquid crystal display), LED (light-emitting diode) display, OLED (organic light-emitting diode) display, or the like. In addition, display 660 could be a semi-opaque display, such as a heads-up display, pass-through display, or the like. Display 660 may present content in association with XR module 622 or other applications 628. In addition, display 660 may be configured to present image data of the physical environment, such as image data from a pass-through camera, or the like.

Although electronic device 600 is depicted as comprising the numerous components described above, in one or more embodiments, the various components may be distributed across multiple devices. Further, additional components may be used and/or some combination of the functionality of any of the components may be combined.

Figure 7:
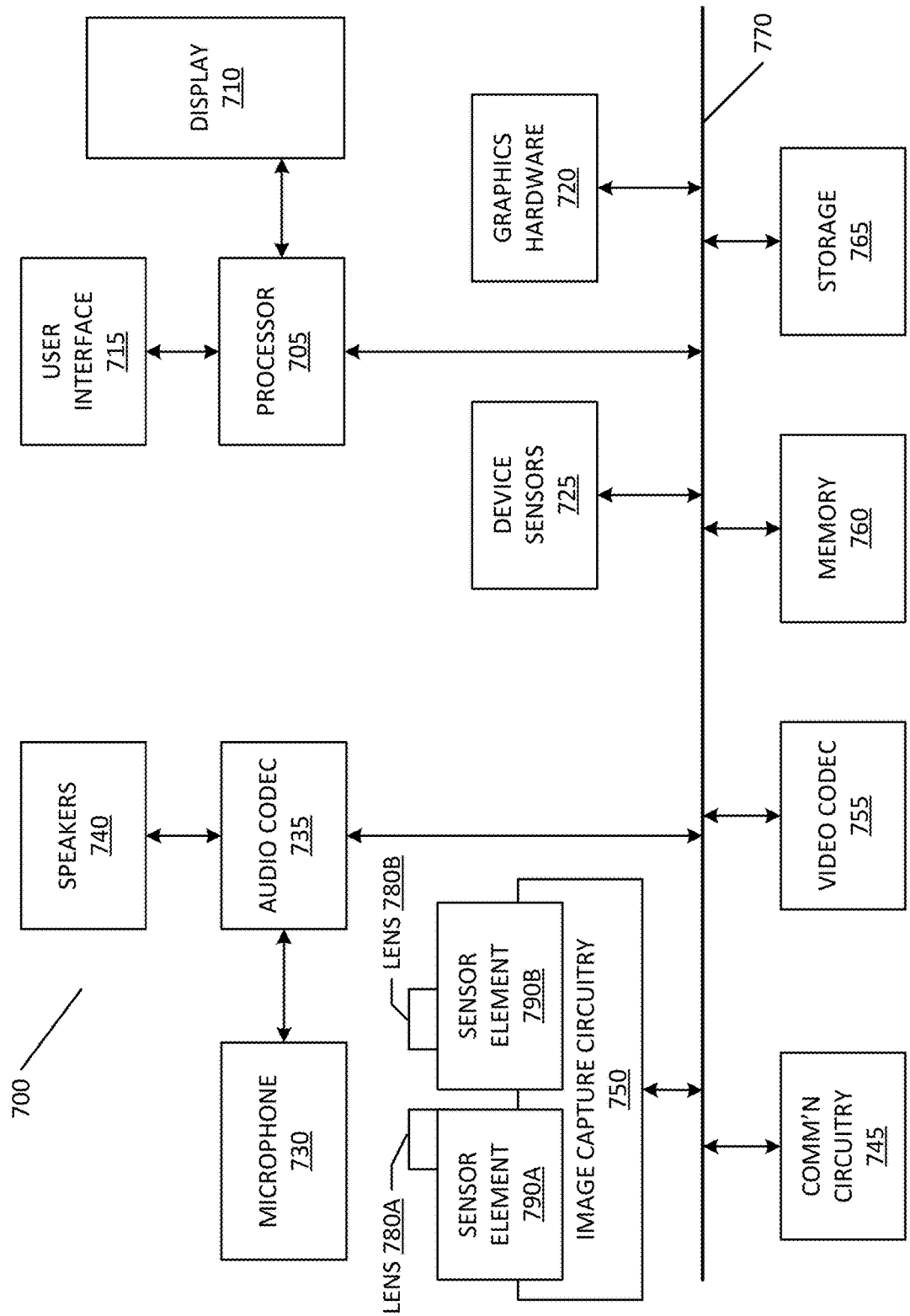
FIG. 7 shows, in block diagram form, a simplified multifunctional device according to one or more embodiments.

Referring now to FIG. 7, a simplified functional block diagram of illustrative multifunction device 700 is shown according to one embodiment. Multifunction electronic device 700 may include processor 705, display 710, user interface 715, graphics hardware 720, sensors 725 (e.g., proximity sensor/ambient light sensor, accelerometer and/or gyroscope), microphone 730, audio codec(s) 735, speaker(s) 740, communications circuitry 745, digital image capture circuitry 750 (e.g., including camera system), video codec(s) 755 (e.g., in support of digital image capture unit), memory 760, storage device 765, and communications bus 770. Multifunction electronic device 700 may be, for example, a digital camera or a personal electronic device such as a personal media player, mobile telephone, head-mounted device, or a tablet computer.

Processor 705 may execute instructions necessary to carry out or control the operation of many functions performed by device 700 (e.g., the generation and/or processing of images as disclosed herein). Processor 705 may, for instance, drive display 710 and receive user input from user interface 715. User interface 715 may allow a user to interact with device 700. For example, user interface 715 can take a variety of forms, such as a button, keypad, dial, click wheel, keyboard, display screen and/or a touch screen. Processor 705 may also, for example, be a system-on-chip such as those found in mobile devices and include a dedicated GPU. Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 to process graphics information. In one embodiment, graphics hardware 720 may include a programmable GPU.

Image capture circuitry 750 may include two (or more) lens assemblies 780A and 780B, where each lens assembly may have a separate focal length. For example, lens assembly 780A may have a short focal length relative to the focal length of lens assembly 780B. Each lens assembly may have a separate associated sensor element, as shown with sensor element 790A and sensor element 790B. Alternatively, two or more lens assemblies may share a common sensor element. Image capture circuitry 750 may capture still and/or video images. Output from image capture circuitry 750 may be processed, at least in part, by video codec(s) 755, and/or processor 705, and/or graphics hardware 720, and/or a dedicated image processing unit or pipeline incorporated within circuitry 750. Images so captured may be stored in memory 760 and/or storage 765.

Sensor and camera circuitry 750 may capture still and video images that may be processed in accordance with this disclosure, at least in part, by video codec(s) 755, and/or processor 705, and/or graphics hardware 720, and/or a dedicated image processing unit incorporated within circuitry 750. Images so captured may be stored in memory 760 and/or storage 765. Memory 760 may include one or more different types of media used by processor 705 and graphics hardware 720 to perform device functions. For example, memory 760 may include memory cache, read-only memory (ROM), and/or random access memory (RAM). Storage 765 may store media (e.g., audio, image, and video files), computer program instructions or software, preference information, device profile information, and any other suitable data. Storage 765 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to tangibly retain computer program instructions or code organized into one or more modules and written in any desired computer programming language. When executed by, for example, processor 705, such computer program code may implement one or more of the methods described herein.

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:
   collecting, by a device, a first set of sensor data for an environment;
   determining a velocity of the device;
   determining a volume boundary of a volume around the device based on the velocity;
   detecting a physical object in the environment based on the first set of sensor data; and
   in accordance with a determination that the physical object intersects the volume boundary, initiating a notification procedure.

2. The method of claim 1, wherein the device is configured to present virtual content on a display, and wherein the notification procedure comprises removing the virtual content from the display.

3. The method of claim 1, wherein determining the volume boundary comprises:
   determining a point of origin for the volume based on the device.

4. The method of claim 3, wherein the point of origin is determined based on body tracking data.

5. The method of claim 4, wherein the volume boundary is determined based on the body tracking data.

6. The method of claim 1, wherein the notification procedure comprises performing at least one selected from a group consisting of an audio notification, a visual notification, and a haptic notification.

7. The method of claim 6, wherein initiating the notification procedure comprises:
   determining a direction of the velocity; and
   selecting a notification type in accordance with the direction.

8. A non-transitory computer readable medium comprising computer readable code executable by one or more processors to:
   collect, by a device, a first set of sensor data for an environment;
   determine a velocity of the device;
   determine a volume boundary of a volume around the device based on the velocity;
   detect a physical object in the environment based on the first set of sensor data; and
   in accordance with a determination that the physical object intersects the volume boundary, initiate a notification procedure.

9. The non-transitory computer readable medium of claim 8, wherein the device is configured to present virtual content on a display, and wherein the notification procedure comprises removing the virtual content from the display.

10. The non-transitory computer readable medium of claim 8, wherein the computer readable code to determine the volume boundary comprises computer readable code to:
    determine a point of origin for the volume based on the device.

11. The non-transitory computer readable medium of claim 10, wherein the point of origin is determined based on body tracking data.

12. The non-transitory computer readable medium of claim 8, wherein the notification procedure comprises performing at least one selected from a group consisting of an audio notification, a visual notification, and a haptic notification.

13. The non-transitory computer readable medium of claim 8, wherein the computer readable code to detect a physical object in the environment based on the first set of sensor data comprises computer readable code to:
    obtain depth information indicative of objects in the environment.

14. The non-transitory computer readable medium of claim 8, further comprising computer readable code to:
    detect a change in the velocity to a second velocity less than the velocity; and
    modify the volume boundary in accordance with the second velocity to obtain a second volume.

15. The non-transitory computer readable medium of claim 14, further comprising computer readable code to:
    in accordance with a determination that the physical object is absent from the second volume, cease the notification procedure.

16. A system comprising:
    one or more processors; and
    one or more computer readable media comprising computer readable code executable by the one or more processors to:
      collect a first set of sensor data for an environment;
      determine a velocity of a device;
      determine a volume boundary of a volume around the device based on the velocity;
      detect a physical object in the environment based on the first set of sensor data; and
      in accordance with a determination that the physical object intersects the volume boundary, initiate a notification procedure.

17. The system of claim 16, further comprising:
    a display; and
    computer readable code to:
      present virtual content on a display, wherein the notification procedure comprises removing the virtual content from the display.

18. The system of claim 16, wherein the computer readable code to detect a physical object in the environment based on the first set of sensor data comprises computer readable code to:
    obtain depth information indicative of objects in the environment.

19. The system of claim 16, further comprising computer readable code to:
    detect a change in the velocity to a second velocity less than the velocity; and
    modify the volume boundary in accordance with the second velocity to obtain a second volume.

20. The system of claim 19, further comprising computer readable code to:
    in accordance with a determination that the physical object is absent from the second volume, cease the notification procedure.